United States Patent
Assaad et al.

(10) Patent No.: US 10,014,775 B1
(45) Date of Patent: Jul. 3, 2018

(54) METHODS AND APPARATUS FOR FULL GATE DRIVE OF MULTILEVEL DC-DC CONVERTER WITH FULL DUTY CYCLE OPERATION

(71) Applicant: TEXAS INSTRUMENTS INCORPORATED, Dallas, TX (US)

(72) Inventors: Rida Shawky Assaad, Murphy, TX (US); Angelo William Pereira, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/390,911

(22) Filed: Dec. 27, 2016

(51) Int. Cl.
    *H02M 3/158*     (2006.01)
    *H02M 3/07*     (2006.01)

(52) U.S. Cl.
    CPC .................... *H02M 3/158* (2013.01)

(58) Field of Classification Search
    CPC ... H02M 3/158; H02M 3/07; H02M 2003/072
    See application file for complete search history.

(56) References Cited

U.S. PATENT DOCUMENTS

| | | | |
|---|---|---|---|
| 6,812,782 B2 | 11/2004 | Grant | |
| 8,558,586 B1 * | 10/2013 | Martin | G11C 7/1057 327/108 |
| 2010/0289560 A1 * | 11/2010 | Mavencamp | H02M 1/08 327/538 |
| 2015/0077075 A1 * | 3/2015 | Knoedgen | H02M 1/088 323/272 |
| 2015/0084701 A1 * | 3/2015 | Perreault | H03F 3/193 330/297 |
| 2015/0311792 A1 * | 10/2015 | Amaro | H02M 1/08 323/271 |
| 2015/0340952 A1 | 11/2015 | Manohar et al. | |
| 2016/0043624 A1 * | 2/2016 | Jarvinen | H02M 1/084 323/271 |
| 2016/0065072 A1 * | 3/2016 | Xiu | H02M 1/08 323/271 |
| 2016/0118894 A1 * | 4/2016 | Zhang | H02M 1/08 323/271 |
| 2017/0093282 A1 * | 3/2017 | Moghe | H02M 3/158 |
| 2017/0093283 A1 * | 3/2017 | Leoncini | H02M 3/158 |
| 2017/0117717 A1 * | 4/2017 | Pagano | H02J 50/80 |
| 2017/0126113 A1 * | 5/2017 | Ejury | H02M 1/088 |
| 2017/0126120 A1 * | 5/2017 | Chakraborty | H02M 3/158 |
| 2017/0170722 A1 * | 6/2017 | Jung | H02M 3/07 |

* cited by examiner

*Primary Examiner* — Timothy J Dole
*Assistant Examiner* — Sisay G Tiku
(74) *Attorney, Agent, or Firm* — Michael A. Davis, Jr.; Charles A. Brill; Frank D. Cimino (57) ABSTRACT

Methods and apparatus for bootstrap capacitor sharing in multilevel DC-DC converters are disclosed. In one example, a bootstrap capacitor voltage of the bootstrap capacitor can be alternately shared between respective control gates of a first high side primary switch and a central high side primary switch of the multilevel DC-DC converter at different times during a duty cycle of the multilevel DC-DC converter. In another example, the bootstrap capacitor voltage can be transferred to drive respective control gates of the first and central high side primary switches and can ensure full gate drive of the first and central high side primary switches to avoid channel resistance degradation thereof, even when the multilevel DC-DC converter is operated in a substantially full duty cycle mode.

12 Claims, 8 Drawing Sheets

| | | $t_1$ | $t_2$ | $t_3$ | $t_4$ |
|---|---|---|---|---|---|
| 180 | $S_{HDRV}$ | OPEN | OPEN | OPEN | CLOSE |
| 190 | $S_{LDRV}$ | OPEN | OPEN | OPEN | CLOSE |
| 182 | $S_{HM1}$ | CLOSE | OPEN | OPEN | OPEN |
| 192 | $S_{LM1}$ | CLOSE | OPEN | OPEN | OPEN |
| 184a | $S_{HM3a}$ | OPEN | CLOSE | CLOSE | OPEN |
| 184b | $S_{HM3b}$ | OPEN | CLOSE | CLOSE | OPEN |
| 194 | $S_{LM3}$ | OPEN | CLOSE | CLOSE | OPEN |
| 174 | $S_{HM4}$ | OPEN | 1-D180 | OPEN | OPEN |

| | | $t_1$ | $t_2$ | $t_3$ | $t_4$ |
|---|---|---|---|---|---|
| 180 | $S_{HDRV}$ | OPEN | OPEN | OPEN | CLOSE |
| 190 | $S_{LDRV}$ | OPEN | OPEN | OPEN | CLOSE |
| 182 | $S_{HM1}$ | CLOSE | CLOSE | OPEN | OPEN |
| 192 | $S_{LM1}$ | CLOSE | CLOSE | OPEN | OPEN |
| 184a | $S_{HM3a}$ | OPEN | OPEN | CLOSE | OPEN |
| 184b | $S_{HM3b}$ | OPEN | OPEN | CLOSE | OPEN |
| 194 | $S_{LM3}$ | OPEN | OPEN | CLOSE | OPEN |
| 174 | $S_{HM4}$ | OPEN | OPEN | OPEN | OPEN |

| | | $t_1$ | $t_2$ | $t_3$ | $t_4$ |
|---|---|---|---|---|---|
| 180 | $S_{HDRV}$ | OPEN | CLOSE | OPEN | OPEN |
| 190 | $S_{LDRV}$ | OPEN | CLOSE | OPEN | OPEN |
| 182 | $S_{HM1}$ | CLOSE | OPEN | OPEN | CLOSE |
| 192 | $S_{LM1}$ | CLOSE | OPEN | OPEN | CLOSE |
| 184a | $S_{HM3a}$ | OPEN | OPEN | CLOSE | OPEN |
| 184b | $S_{HM3b}$ | OPEN | OPEN | CLOSE | OPEN |
| 194 | $S_{LM3}$ | OPEN | OPEN | CLOSE | OPEN |
| 174 | $S_{HM4}$ | OPEN | OPEN | OPEN | OPEN |

|  |  | $t_1$ | $t_2$ | $t_3$ | $t_4$ |
|---|---|---|---|---|---|
| 180 | $S_{HDRV}$ | OPEN | CLOSE | OPEN | OPEN |
| 190 | $S_{LDRV}$ | OPEN | CLOSE | OPEN | OPEN |
| 182 | $S_{HM1}$ | CLOSE | OPEN | OPEN | OPEN |
| 192 | $S_{LM1}$ | CLOSE | OPEN | OPEN | OPEN |
| 184a | $S_{HM3a}$ | OPEN | OPEN | CLOSE | CLOSE |
| 184b | $S_{HM3b}$ | OPEN | OPEN | CLOSE | CLOSE |
| 194 | $S_{LM3}$ | OPEN | OPEN | CLOSE | CLOSE |
| 174 | $S_{HM4}$ | OPEN | OPEN | 1-D180 | CLOSE |

METHODS AND APPARATUS FOR FULL GATE DRIVE OF MULTILEVEL DC-DC CONVERTER WITH FULL DUTY CYCLE OPERATION

FIELD OF THE DISCLOSURE

This disclosure relates generally to multilevel DC-DC converters and, more particularly, to methods and apparatus for full gate drive of a multilevel DC-DC converter with full duty cycle operation.

BACKGROUND

CMOS technology is being aggressively scaled to reduce physical dimensions and supply voltage to meet low power, low area and high performance specifications, for example, in portable electronics and other applications. Also, new battery chemistries seek to extend device usage to lower voltages. However, certain loads require regulated higher voltages for proper operation, and are generally powered using a DC-DC converter to convert a lower Direct Current (DC) supply voltage into a desired higher DC voltage.

Various circuit topologies can be used in DC-DC converters. Some circuit topologies use a bootstrap capacitor. While the bootstrap capacitor provides some advantages, some challenges remain.

SUMMARY

In the described examples, methods and apparatus for bootstrap capacitor sharing in multilevel DC-DC converters are disclosed. In certain described examples, a bootstrap capacitor voltage of the bootstrap capacitor can be alternately shared between respective control gates of a first high side primary switch and a central high side primary switch of the multilevel DC-DC converter at different times during a duty cycle of the multilevel DC-DC converter. The bootstrap capacitor voltage can be transferred to drive respective control gates of the first and central high side primary switches and can ensure full gate drive of the first and central high side primary switches to avoid channel resistance degradation thereof, even when the multilevel DC-DC converter is operated in a substantially full duty cycle mode. In other described examples, a method of operating a multilevel DC-DC converter in a substantially full duty cycle mode can include generating drive control signals. Pairs of respective high and low drive high side drive outputs can be controlled in response to the drive control signals. The bootstrap capacitor voltage of the bootstrap capacitor can be transferred through the pairs of respective high and low drive high side drive outputs to drive respective control gates of the first high side primary switch and the central high side primary switch of the multilevel DC-DC converter.

DETAILED DESCRIPTION

Figure 1:
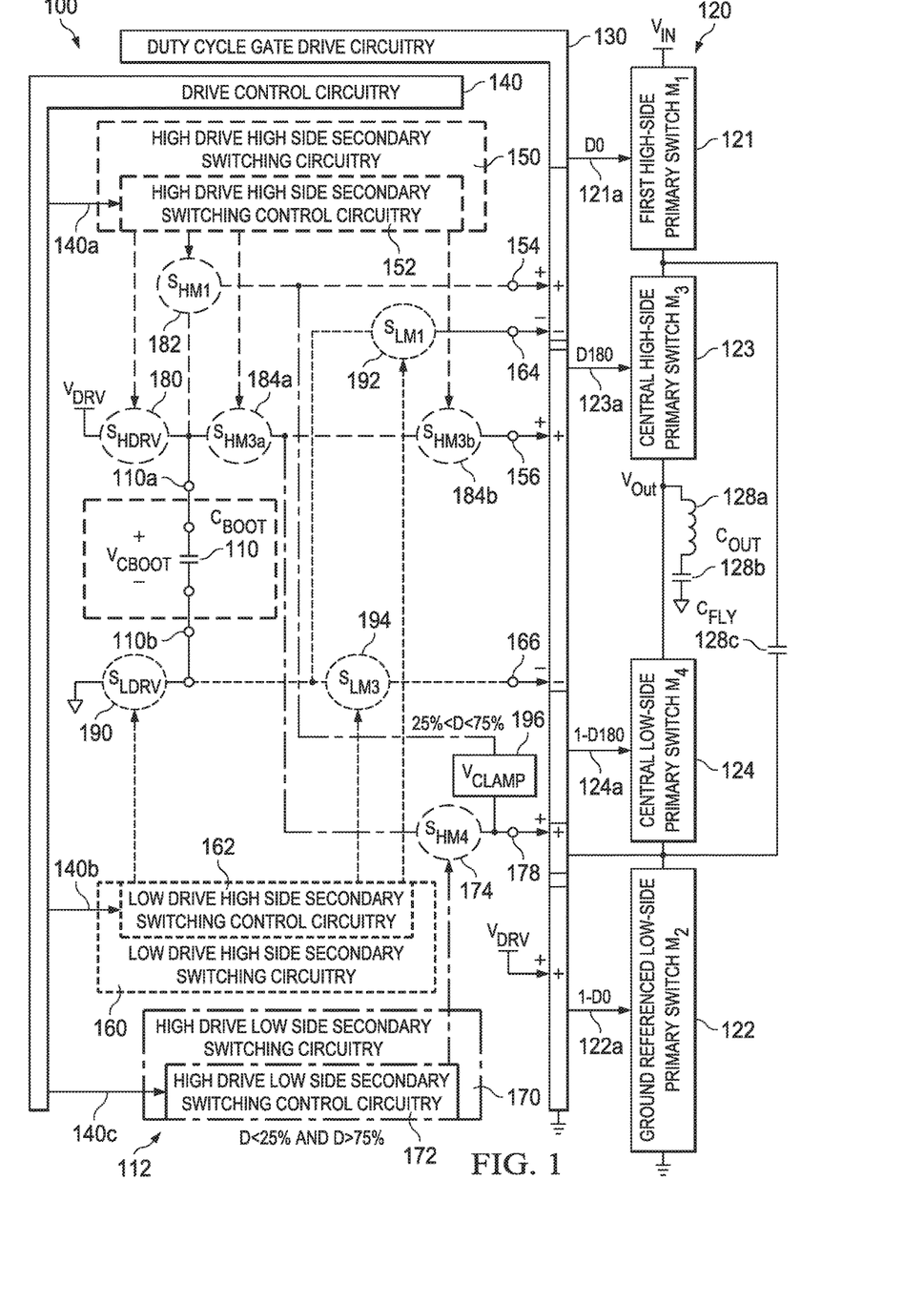
FIG. 1 is partial block diagram according to an embodiment of a system of a bootstrap capacitor, a multilevel DC-DC converter circuit topology for the bootstrap capacitor, and secondary switching circuitry for sharing the bootstrap capacitor.

FIG. 1 is partial block diagram according to an embodiment of a system of a bootstrap capacitor 110, a multilevel DC-DC converter circuit topology 120 for the bootstrap capacitor 110, and secondary switching circuitry 112 for sharing the bootstrap capacitor 110. In the example of FIG. 1, the multilevel DC-DC converter circuit topology 120 is a three level DC-DC converter circuit topology 120. In operation, multilevel DC-DC converter circuit topology 110 has an operating mode having a duty cycle. Although the multilevel DC-DC converter circuit topology 120 is for use with bootstrap capacitor 110, in many examples the multilevel DC-DC converter circuit topology 120 is packaged in an integrated circuitry package separate from the bootstrap capacitor 110. The multilevel DC-DC converter circuit topology 120 can be electrically coupled with bootstrap capacitor 110 external to the integrated circuit package through bootstrap capacitor couplers 110a, 110b. Moreover, in many examples an additional bootstrap capacitor, in addition to the bootstrap capacitor 110, may not be needed because secondary switching circuitry 112 is for sharing the bootstrap capacitor 110, and can facilitate avoiding a need for the additional bootstrap capacitor. The foregoing sharing of the bootstrap capacitor, and avoiding need for the additional bootstrap capacitor, can lead to a significant savings in cost or space or expense or combinations thereof. In the figures, bootstrap capacitor 110 is depicted as external to the integrated circuit package by depicting bootstrap capacitor 110 as boxed within a box having a dash-dot-dot-dash line style.

In the example of FIG. 1, multilevel DC-DC converter circuit topology 120 includes a series connection of at least four primary switches 121, 123, 124, 122 extending between a DC voltage rail VIN and a ground reference. The at least four primary switches 121, 123, 124, 122 include a central high-side primary switch 123 (M3) coupled in series between a first high-side primary switch 121 (M1) and a central low-side primary switch 124 (M4). The central low-side primary switch 134 (M4) is coupled in series between the central high-side primary switch 123 (M3) and a ground referenced low-side primary switch 122 (M2). The multilevel DC-DC converter circuit topology 120 includes an output node VOUT coupled between the central high-side primary switch 123 (M3) and the central low-side primary switch 124 to provide an output voltage of the multilevel DC-DC converter circuit topology 120. An inductor 128a having an output inductance L can be coupled in series with the output node VOUT. An output capacitor 128b having an output capacitance CO can be coupled in parallel with the output voltage of the output node VOUT.

As shown in the example of FIG. 1, flying capacitor 128c (CFLY) can be coupled at a first coupling node to a series connection of the first high-side primary switch 121 (M1) and the central high-side primary switch 123 (M3). The flying capacitor 128c (CFLY) can be coupled at a second coupling node to a series connection of the central low-side primary switch 124 and the ground referenced low-side primary switch 122.

In operation, multilevel DC-DC converter circuit topology 110 has an operating mode having a duty cycle. Duty cycle gate drive circuitry 130 can be coupled to respective control gates of the at least four primary switches 121, 123, 124, 122 of the multilevel DC-DC converter circuit topology 120, for operating the multilevel DC-DC converter circuit topology 120 in the operating mode having the duty cycle. In the example of FIG. 1A, the duty cycle gate drive circuitry 130 drives the control gate of the first high side primary switch 121 (M1) with a first duty cycle control signal understood as a zero-phase reference duty cycle control signal 121a (D0). The duty cycle gate drive circuitry 130 drives the control gate of the central high side primary switch 123 (M3) with a second duty cycle control signal 123a (D180), understood as being one hundred and eighty degrees out of phase with the first, zero phase reference, duty cycle control signal 121a (D0). The duty cycle gate drive circuitry 130 drives the control gate of the central low side primary switch 124 with a third duty cycle control signal 124a (1-D180) understood as being, an inverse of the second duty cycle control signal 123a (D180). The duty cycle gate drive circuitry 130 drives the control gate of the ground referenced low side primary switch 122 with a fourth duty cycle control signal 122a (1-D0), understood as being, an inverse of the first, zero phase reference, duty cycle control signal 121a (D0).

In the example of FIG. 1, drive control circuitry 140 can generate a first drive control signal 140a, a second drive control signal 140b and a third drive control signal 140c coupled with the secondary switching circuitry 112, for control of the secondary switching circuitry 112. The secondary switching circuitry 112 for sharing the bootstrap capacitor 110 can include high and low drive high side secondary switching circuitry 150, 160 and high drive low side secondary switching circuitry 170. As depicted in the figures using a dashed line style for everything shown in the figures as included in the high drive high side secondary switching circuitry 150, the high drive high side secondary switching circuitry 150 can include a high drive high side driving source voltage switch 180 (SHDRV), a first high drive high side switch 182 (SHM1), a second high drive high side switch 184a (SHM3a), an additional high drive high side switch 184b (SHM3b), and high drive high side secondary switching control circuitry 152 coupled with these respective switches to control them. As depicted in the figures using a stippled line style for everything shown in the figures as included in the low drive high side secondary switching circuitry 160, the low drive high side secondary switching circuitry 160 can include a low drive high side driving source ground reference switch 190 (SLDRV), a first low drive high side switch 192 (SLM1), a second low drive high side switch 194 (SLM3), and low drive high side secondary switching control circuitry 162 coupled with these respective switches to control them. As depicted in the figures using a dash-dot-dash line style for everything shown in the figures as included in the high drive low side secondary switching circuitry 170, the high drive low side secondary switching circuitry 170 can include a high drive low side switch 174 (SHM4), and high drive low side secondary switching control circuitry 172 coupled with the high drive low side switch 174 (SHM4) to control the high drive low side switch 174 (SHM4).

The high and low drive high side secondary switching circuitry 150, 160 can control a first pair of high and low drive high side drive outputs 154, 164, in response to the first and second drive control signals 140a, 140b. The first pair of high and low high side drive outputs 154, 164 can be coupled to the duty cycle gate drive circuitry 130 to drive a control gate of the first high side primary switch 121 (M1) in any and all duty cycle modes of the multilevel DC-DC converter circuit topology 120. Further, the high and low drive high side secondary switching circuitry 150, 160 can control a second pair of high and low drive high side drive outputs 156, 166 in response to the first and second drive control signals 140a, 140b. The second pair of high and low high side drive outputs 156, 166 can be coupled to the duty cycle gate drive circuitry 130 to drive a control gate of the central high-side primary switch 123 (M3) in any and all duty cycle modes of the multilevel DC-DC converter circuit topology 120. Accordingly, the high and low drive high side secondary switching circuitry 150, 160 can control first and second pairs of respective high and low drive high side drive outputs 154, 164, 156, 166 in response to the first and second drive control signals 140a, 140b. The first and second pairs of respective high and low high side drive outputs 154, 164, 156, 166 can be coupled to the duty cycle gate drive circuitry 130 to drive respective control gates of the first high side primary switch 121 (M1) and the central high side primary switch 123 (M3) in any and all duty cycle modes of the DC-DC converter circuit topology.

In the foregoing, and elsewhere herein, any and all duty cycle modes of the multilevel DC-DC converter circuit topology 120 includes a substantially full duty cycle mode. The substantially full duty cycle mode of the multilevel DC-DC converter circuit topology 120 is a greater than seventy five percent duty cycle mode of the multilevel DC-DC converter circuit topology 120. In the foregoing, and elsewhere herein, any and all duty cycle modes of the multilevel DC-DC converter circuit topology 120 includes additional modes at duty cycles less than the substantially full duty cycle. In the foregoing, and elsewhere herein, any and all duty cycle modes of the multilevel DC-DC converter circuit topology 120 includes duty cycle modes between fifty percent duty cycle and seventy-five percent duty cycle. In the foregoing, and elsewhere herein, any and all duty cycle modes of the multilevel DC-DC converter circuit topology 120 includes duty cycle modes between twenty-five percent duty cycle and fifty percent duty cycle. In the foregoing, and elsewhere herein, any and all duty cycle modes of the multilevel DC-DC converter circuit topology 120 includes duty cycle modes of less than twenty-five percent duty cycle.

As shown in the example of FIG. 1, the bootstrap capacitor 110 can be coupled between the high and low drive high side secondary switching circuitry 150, 160 (e.g., via bootstrap capacitor couplers 110a, 110b) to transfer a bootstrap capacitor voltage (VCBOOT) of the bootstrap capacitor 110 through the high and low drive high side secondary switching circuitry 150, 160 and through the first pair of high and low drive high side drive outputs 154, 164 and through the duty cycle gate drive circuitry 130 to drive the control gate of the first high side primary switch 121 (M1) using the transferred bootstrap capacitor voltage, when the multilevel DC-DC converter circuit topology 120 is operated in any and all duty cycle modes of the multilevel DC-DC converter circuit topology 120. Further, the bootstrap capacitor 110 can be coupled between the high and low drive high side secondary switching circuitry 150, 160 (e.g., via bootstrap capacitor couplers 110a, 110b) to transfer the bootstrap capacitor voltage (VCBOOT) of the bootstrap capacitor 110 through the high and low drive high side secondary switching circuitry 150, 160 and through the second pair of high and low drive high side drive outputs 156, 166 and through the duty cycle gate drive circuitry 130 to drive the control gate of the central high side primary switch 123 (M3) using the transferred bootstrap capacitor voltage, when the multilevel DC-DC converter circuit topology 120 is operated in any and all duty cycle modes of the multilevel DC-DC converter circuit topology 120. Accordingly, the bootstrap capacitor 110 can be coupled between the high and low drive high side secondary switching circuitry 150, 160 (e.g., via bootstrap capacitor couplers 110a, 110b) to transfer the bootstrap capacitor voltage (VCBOOT) of the bootstrap capacitor 110 through the high and low drive high side secondary switching circuitry 150, 160 and through the first and second pairs of respective high and low drive high side drive outputs 154, 164, 156, 166 and through the duty cycle gate drive circuitry 130 to drive respective control gates of the first high side primary switch 121 (M1) and the central high side primary switch 123 (M3) using the transferred bootstrap capacitor voltage, when the multilevel DC-DC converter circuit topology 120 is operated in any and all duty cycle modes of the multilevel DC-DC converter circuit topology 120. Moreover, in the foregoing, the bootstrap capacitor voltage (VCBOOT) transferred to drive respective control gates of the first and central high side primary switches 121,123 can ensure full gate drive of the first and central high side primary switches 121, 123 to avoid channel resistance degradation thereof when the multilevel DC-DC converter circuit topology 120 is operated in any and all duty cycle modes.

The high drive high side secondary switching circuitry 150 includes the high drive high side driving source voltage switch 180 (SHDRV), shown as coupled between the driving voltage source (VDRV) and the bootstrap capacitor 110 in the example of FIG. 1. Additionally, the low drive high side secondary switching circuitry 160 includes the low drive high side driving source ground reference switch 190 (SLDRV), shown as coupled between the bootstrap capacitor 110 and a ground reference in the example of FIG. 1. The high and low drive high side secondary switching control circuitries 152, 162 can respectively control the high drive high side driving source voltage switch 180 (SHDRV) and low drive high side driving source ground reference switch 190 (SLDRV) in respective conducting switch states, so as to refresh the bootstrap capacitor 110 with charge during a selected period of the duty cycle of the multi-level DC-DC converter circuit topology. For example, the high and low drive high side secondary switching control circuitries 152, 162 can respectively control the high drive high side driving source voltage switch 180 (SHDRV) and low drive high side driving source ground reference switch 190 (SLDRV) in respective conducting switch states, so as to refresh the bootstrap capacitor 110 with charge during a fourth quarter period of a cycle period (T) of the multi-level DC-DC converter circuit topology, for example, when operating in the substantially full duty cycle mode, or, for example, when operating between fifty percent and seventy-five percent duty cycle. As another example, the high and low drive high side secondary switching control circuitries 152, 162 can respectively control the high drive high side driving source voltage switch 180 (SHDRV) and low drive high side driving source ground reference switch 190 (SLDRV) in respective conducting switch states, so as to refresh the bootstrap capacitor 110 with charge during a second quarter period of the cycle period (T) of the multi-level DC-DC converter circuit topology, for example, when operating between twenty-five percent and fifty percent duty cycle in the substantially full duty cycle mode, or, for example, when operating at less than twenty-five percent duty cycle.

As shown in the example of FIG. 1, the high and low drive high side secondary switching circuitry 150, 160 include a first pair of high and low drive high side switches 182, 192 (SHM1, SLM1). The bootstrap capacitor 110 can be coupled, for example via bootstrap capacitor couplers 110a, 110b, between the first pair of high and low drive high side switches 182, 192 (SHM1, SLM1). The example of FIG. 1 shows the first pair of high and low drive high side switches 182, 192 (SHM1, SLM1) coupled between the bootstrap capacitor 110 and the first pair of the high and low high side drive outputs 154, 164. As mentioned previously, and as shown in the example of FIG. 1, the first pair of the high and low high side drive outputs 154, 164 are coupled to the duty cycle gate drive circuitry 130 to drive the control gate of the first high side primary switch 121 (M1). The high and low drive high side secondary switching circuitries 150, 160 include respective high and low drive high side secondary switching control circuitries 152, 162 to respectively control the first pair of high and low drive high side switches 182, 192 (SHM1, SLM1) in respective conducting switch states during a selected period of the cycle period (T), so as to transfer the bootstrap capacitor voltage of the bootstrap capacitor 110 through the first pair of high and low drive high side switches 182, 192 (SHM1, SLM1), and through the first pair of high and low drive high side drive outputs 154, 164 and through the duty cycle gate drive circuitry 130 during the selected period of the cycle period (T) to drive the control gate of the first high side primary switch 121 (M1), when the multilevel DC-DC converter circuit topology is operated in any and all duty cycle modes.

For example, the first pair of high and low drive high side switches 182, 192 (SHM1, SLM1) can be controlled in the respective conducting switch states during a first quarter period of the cycle period (T), so as to transfer the bootstrap capacitor voltage of the bootstrap capacitor 110 through the first pair of high and low drive high side switches 182, 192 (SHM1, SLM1), and through the first pair of high and low drive high side drive outputs 154, 164 and through the duty cycle gate drive circuitry 130 during the first quarter period of the cycle period (T) to drive the control gate of the first high side primary switch 121 (M1), when the multilevel DC-DC converter circuit topology is operated, for example, in the substantially full duty cycle mode, or for example, in the less than twenty-five percent duty cycle mode. As another example, the first pair of high and low drive high side switches 182, 192 (SHM1, SLM1) can be controlled in the respective conducting switch states during first and second quarter periods of the cycle period (T), so as to transfer the bootstrap capacitor voltage of the bootstrap capacitor 110 through the first pair of high and low drive high side switches 182, 192 (SHM1, SLM1), and through the first pair of high and low drive high side drive outputs 154, 164 and through the duty cycle gate drive circuitry 130 during the first and second quarter periods of the cycle period (T) to drive the control gate of the first high side primary switch 121 (M1), when the multilevel DC-DC converter circuit topology is operating between fifty percent and seventy-five percent duty cycle. As yet another example, the first pair of high and low drive high side switches 182, 192 (SHM1, SLM1) can be controlled in the respective conducting switch states during first and fourth quarter periods of the cycle period (T), so as to transfer the bootstrap capacitor voltage of the bootstrap capacitor 110 through the first pair of high and low drive high side switches 182, 192 (SHM1, SLM1), and through the first pair of high and low drive high side drive outputs 154, 164 and through the duty cycle gate drive circuitry 130 during the first and fourth quarter periods of the cycle period (T) to drive the control gate of the first high side primary switch 121 (M1), when the multilevel DC-DC converter circuit topology is operating between twenty-five percent and fifty percent duty cycle.

As shown in the example of FIG. 1, the high and low drive high side secondary switching circuitry 150, 160 include the second pair of high and low drive high side switches 184*a*, 194 (SHM3*a*, SLM3). The bootstrap capacitor 110 can be coupled, for example via bootstrap capacitor couplers 110*a*, 110*b*, between the second pair of high and low drive high side switches 184*a*, 194 (SHM3*a*, SLM3). The example of FIG. 1 shows the second pair of high and low drive high side switches 184*a*, 194 (SHM3*a*, SLM3) is coupled between the bootstrap capacitor 110 and the second pair of the high and low high side drive outputs 156, 166. The high drive high side secondary switching circuitry 150 can also include an additional high drive high side switch 184*b* (SHM3*b*). The additional high drive high side switch 184*b* (SHM3*b*) can be coupled between the high drive member 184*a* (SHM3*a*) of the second pair of high and low drive high side switches 184*a*, 194 (SHM3*a*, SLM3) and a high member 156 of the second pair of the high and low high side drive outputs 156, 166. As mentioned previously, and as shown in the example of FIG. 1, the second pair of the high and low high side drive outputs 156, 166 is coupled to the duty cycle gate drive circuitry 130 to drive the control gate of the central high side primary switch 123 (M3).

The high and low drive high side secondary switching circuitries 150, 160 include respective high and low drive high side secondary switching control circuitries 152, 162 to respectively control the second pair of high and low drive high side switches 184*a*, 194 (SHM3*a*, SLM3), along with the additional high drive high side switch 184*b* (SHM3*b*), in respective conducting switch states during a selected period of the cycle period (T), so as to transfer the bootstrap capacitor voltage of the bootstrap capacitor 110 through the second pair of high and low drive high side switches 184*a*, 194 (SHM3*a*, SLM3), and through the additional high drive high side switch 184*b* (SHM3*b*), and through the second pair of the high and low high side drive outputs 156, 166 and through the duty cycle gate drive circuitry 130 during the selected period of the cycle period (T) to drive the control gate of central high side primary switch 123 (M3) when the multilevel DC-DC converter circuit topology is operated in any and all duty cycle modes.

For example, the second pair of high and low drive high side switches 184*a*, 194 (SHM3*a*, SLM3) can be controlled in the respective conducting switch states, along with the additional high drive high side switch 184*b* (SHM3*b*), during second and third quarter periods of the cycle period (T), so as to transfer the bootstrap capacitor voltage of the bootstrap capacitor 110 through the second pair of high and low drive high side switches 184*a*, 194 (SHM3*a*, SLM3), and through the additional high drive high side switch 184*b* (SHM3*b*), and through the second pair of the high and low high side drive outputs 156, 166 and through the duty cycle gate drive circuitry 130 during the second and third quarter periods of the cycle period (T) to drive the control gate of the central high side primary switch 123 (M3), when the multilevel DC-DC converter circuit topology is operated, for example, in the substantially full duty cycle mode.

As another example, the second pair of high and low drive high side switches 184*a*, 194 (SHM3*a*, SLM3) can be controlled in the respective conducting switch states, along with the additional high drive high side switch 184*b* (SHM3*b*), during the third quarter period of the cycle period (T), so as to transfer the bootstrap capacitor voltage of the bootstrap capacitor 110 through the second pair of high and low drive high side switches 184*a*, 194 (SHM3*a*, SLM3), and through the additional high drive high side switch 184*b* (SHM3*b*), and through the second pair of the high and low high side drive outputs 156, 166 and through the duty cycle gate drive circuitry 130 during the third quarter period of the cycle period (T) to drive the control gate of the central high side primary switch 123 (M3), when the multilevel DC-DC converter circuit topology is operating, for example, between fifty percent and seventy-five percent duty cycle, and for example, between twenty-five percent and fifty percent duty cycle.

As yet another example, the second pair of high and low drive high side switches 184a, 194 (SHM3a, SLM3) can be controlled in the respective conducting switch states, along with the additional high drive high side switch 184b (SHM3b), during the third and fourth quarter periods of the cycle period (T), so as to transfer the bootstrap capacitor voltage of the bootstrap capacitor 110 through the second pair of high and low drive high side switches 184a, 194 (SHM3a, SLM3), and through the additional high drive high side switch 184b (SHM3b), and through the second pair of the high and low high side drive outputs 156, 166 and through the duty cycle gate drive circuitry 130 during the third and fourth quarter periods of the cycle period (T) to drive the control gate of the central high side primary switch 123 (M3), when the multilevel DC-DC converter circuit topology is operating, for example, in less than twenty-five percent duty cycle.

Also shown in the example of FIG. 1 is high drive low side secondary switching circuitry 170. The high drive low side secondary switching circuitry 170 can control a high drive low side drive output 178. The high drive low side drive output 178 can be coupled through the duty cycle gate drive circuitry 130 to drive a control gate of a central low side primary switch 124 (M4) of the at least four primary switches, for example, when the multilevel DC-DC converter circuit topology 120 is operated in a substantially full duty cycle mode, and for example, when the multilevel DC-DC converter circuit topology 120 is operated in a less than twenty-five percent duty cycle mode. When the multilevel DC-DC converter circuit topology 120 is operated in these duty cycle modes (e.g., substantially full duty cycle, and e.g., less than twenty-five percent duty cycle) the high drive low side secondary switching circuitry 170 can be coupled with the high drive high side secondary switching circuitry 150 to transfer the bootstrap capacitor voltage (VCBOOT) of the bootstrap capacitor 110 to drive the control gate of the central low side primary switch 124 (M4) using the transferred bootstrap capacitor voltage (VCBOOT). The bootstrap capacitor voltage (VCBOOT) transferred to drive the control gate of the central low side primary switch 124 (M4) can ensure full gate drive of the central low side primary switch 124 (M4) in these duty cycle modes (e.g., substantially full duty cycle, and e.g., less than twenty-five percent duty cycle). Full gate drive of the central low side primary switch 124 (M4) via transfer of the bootstrap capacitor voltage (VCBOOT) can facilitate avoiding channel resistance degradation of the central low side primary switch 124 (M4), when the multilevel DC-DC converter circuit topology 120 is operating in these duty cycle modes (e.g., substantially full duty cycle, and e.g., less than twenty-five percent duty cycle). Accordingly, the bootstrap capacitor can be coupled, for example, via bootstrap capacitor couplers 110a, 110b, to the high drive low side secondary switching circuitry 170, so as to transfer the bootstrap capacitor voltage (VCBOOT) of the bootstrap capacitor 110 through the high drive low side secondary switching circuitry and through the high drive low side drive output 178 and through the duty cycle gate drive circuitry 130 to drive the control gate of the central low side primary switch 124 using the transferred bootstrap capacitor voltage (VCBOOT), when the multilevel DC-DC converter circuit topology 120 is operating in these duty cycle modes (e.g., substantially full duty cycle, and e.g., less than twenty-five percent duty cycle).

As mentioned previously herein, the drive control circuitry 140 can generate the third drive control signal 140c. The high drive low side secondary switching circuitry can control the high drive low side drive output 178 in response to the third drive control signal 140c when the multilevel DC-DC converter circuit topology 120 is operating in these duty cycle modes (e.g., substantially full duty cycle, and e.g., less than twenty-five percent duty cycle). More specifically, the high drive low side secondary switching circuitry 170 can include high drive low side switch 174 (SHM4). The high drive low side switch 174 (SHM4) can be coupled between the high drive low side drive output 178 and the high drive high side secondary switching circuitry 150 at a node between the high side member 184a (SHM3a) of the second pair of high and low drive high side switches 184a, 194 (SHM3a, SLM3) and the additional high drive high side switch 184b (SHM3b). The high drive low side secondary switching circuitry 170 can include high drive low side secondary switching control circuitry 172. The high drive low side secondary switching control circuitry 172 can control the high drive low side switch 174 (SHM4) in the conducting switch state synchronized with 1-D180, which is an inverse of a one-hundred-and-eighty degree phase shift of the duty cycle control signal of the first high side primary switch 121 (M1) (e.g. inverse of the one-hundred-and-eighty degree phase shift of D0.) This controlling the high drive low side switch 174 (SHM4) in the conducting switch state synchronized with 1-D180 can transfer the bootstrap capacitor voltage of the bootstrap capacitor 110 through the high drive member 184a (SHM3a) of the second pair of high and low drive high side switches 184a, 194 (SHM3a, SLM3) and through the high drive low side switch 174 (SHM4) and through the high drive low side drive output 176 and through the duty cycle gate drive circuitry 130 to drive the control gate of the central low side primary switch 124 synchronized with 1-D180, when the multilevel DC-DC converter circuit topology 120 is operated in the substantially full duty cycle mode and in operating modes less than the twenty-five percent duty cycle.

The foregoing discussion is directed to operation of the high drive low side secondary switching circuitry 170 to share the bootstrap capacitor voltage (VCBOOT) for driving the central low side primary switch 124 (M4) when the multilevel DC-DC converter circuit topology 120 is operated in the substantially full duty cycle mode and in operating modes less than the twenty-five percent duty cycle (e.g. D<25% & D>75%). In contrast, when the multilevel DC-DC converter circuit topology 120 is operated in operating modes between twenty-five percent duty cycle and seventy-five percent duty cycle (e.g. 25%<D<75%), a regulation clamp 196 can be coupled with the duty cycle gate drive circuitry 130 to drive the control gate of the central low side primary switch 124. As shown in the example of FIG. 1, the regulation clamp 196 can be coupled between the duty cycle gate drive circuitry 130 and the high drive high side secondary switching circuitry 150. In particular, as shown in the example of FIG. 1, the regulation clamp 196 can be coupled to the high drive high side secondary switching circuitry 150 at a node located between the first high drive high side switch 182 (SHM1) and the high member 154 of the first pair of high and low drive high side drive outputs 154, 164.

Figure 2:
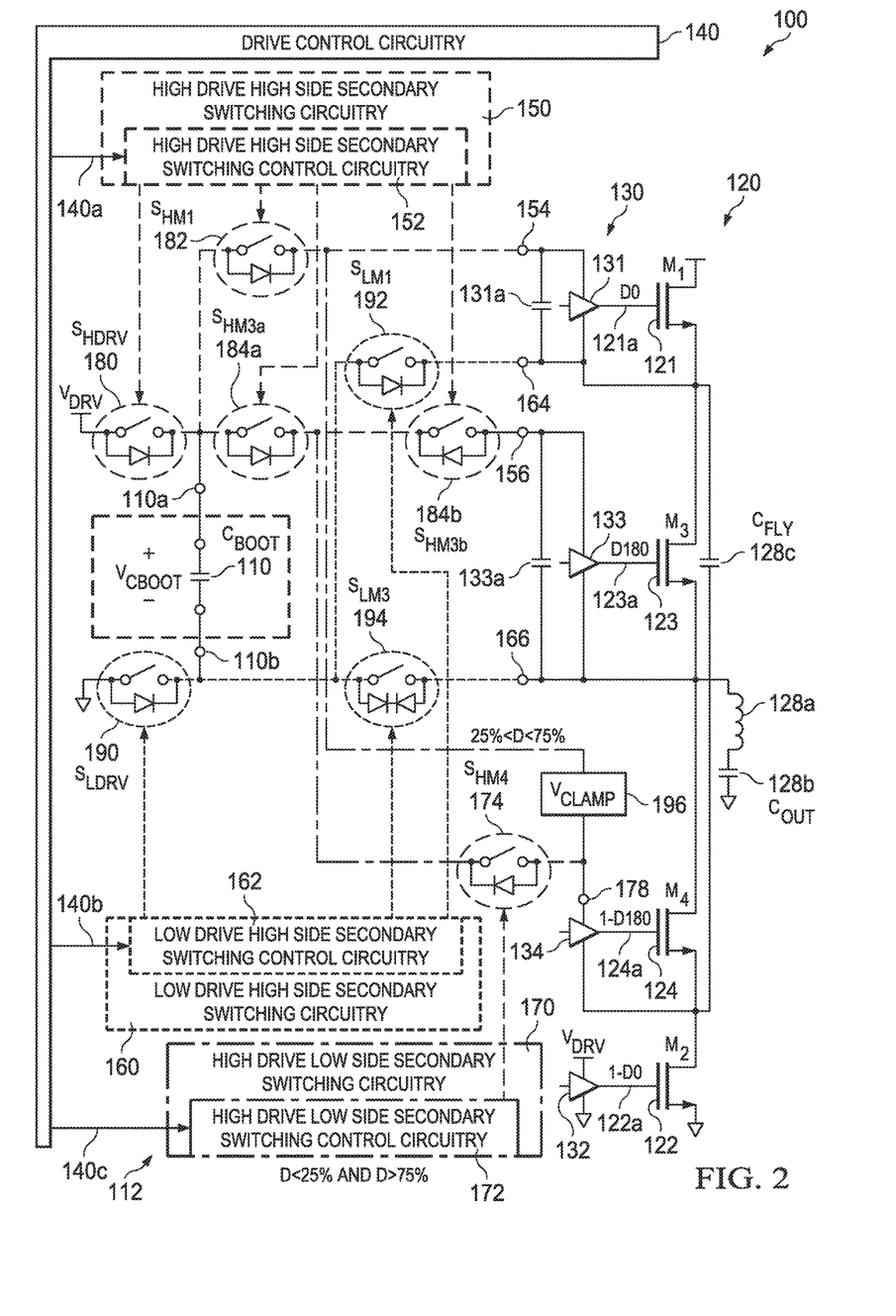
FIG. 2 is a more detailed diagram, according to an embodiment, showing more detailed example circuit elements, relative to what is shown in FIG. 1.

FIG. 2 is a more detailed diagram, according to an embodiment, showing more detailed example circuit elements, relative to what is shown in FIG. 1. In particular, while the first high side primary switch 121 (M1), the central high side primary switch 123 (M3), the central low side primary switch 124 (M4) and the ground referenced low side primary switch 122 (M2) were depicted as blocks in FIG. 1, they are depicted in FIG. 2 as transistors of type known in the art for use in DC-DC converters. Further, duty cycle gate drive circuitry 130 is shown in greater detail in FIG. 2 as including respective drivers 131, 133, 134 and 132 coupled with control gates of the primary transistors 121,123,124, 122.

In the example of FIG. 2, first high side primary driver 131 is shown, along with associated driver capacitor 131a, as coupled between the first pair of high and low drive high side drive outputs 154, 164, for driving the control gate of the first high side primary transistor 121 (M1). Central high side primary driver 133, along with associated driver capacitor 133a, are coupled between the second pair of high and low drive high side drive outputs 156, 166, for driving the control gate of the central high side primary transistor 123 (M3). Central low side primary driver 134 is coupled with the high drive low side drive output 178 for driving the control gate of the central low side primary transistor 124 (M4). Ground referenced low side primary driver 132 is coupled with the driving voltage source (VDRV) for driving the control gate of the ground referenced low side primary switch 122 (M2), Further, while secondary switches were depicted in FIG. 1 as oval blocks, they are depicted in FIG. 2 as controllable, closeable secondary switches. As the other circuit elements of FIG. 2 have already been discussed previously herein with respect to FIG. 1, they are not discussed again here, but the reader can refer to their previous discussion with respect to FIG. 1.

As discussed previously, the duty cycle gate drive circuitry 130 drives the control gate of the first high side primary switch 121 (M1) with the first duty cycle control signal understood as a zero-phase reference duty cycle control signal 121a (D0). The duty cycle gate drive circuitry 130 drives the control gate of the central high side primary switch 123 (M3) with the second duty cycle control signal 123a (D180), understood as being one hundred and eighty degrees out of phase with the first, zero phase reference, duty cycle control signal 121a (D0). The duty cycle gate drive circuitry 130 drives the control gate of the central low side primary switch 124 with the third duty cycle control signal 124a (1-D180) understood as being, an inverse of the second duty cycle control signal 123a (D180). FIGS. 3A, 4A, 5A, 6A are timing diagrams of the first, second and third duty cycle control signals 121a, 123a, 124a (D0, D180, 1-D18) over first quarter period t1, second quarter period t2, third quarter period t3 and fourth quarter period t4 of the cycle period (T) shown in each of the figures. Left to right hatching shows timing of sharing of the bootstrap capacitor, and more particular transferring of the bootstrap capacitor voltage through the secondary switching circuitry, to drive the control gate of the first high side primary switch 121 (M1). Cross hatching shows timing of sharing of the bootstrap capacitor, and more particular transferring of the bootstrap capacitor voltage through the secondary switching circuitry, to drive the control gate of the central high side primary switch 123 (M3). Right to left hatching shows timing of refreshing the bootstrap capacitor with charge.

Figure 3A:
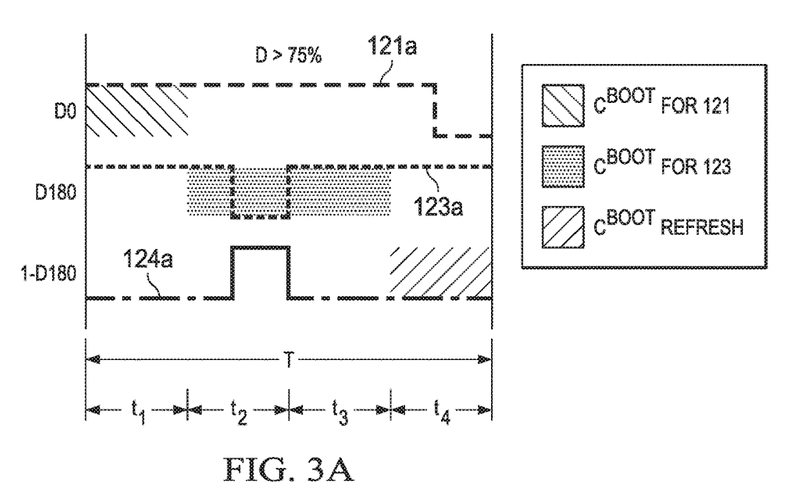
FIG. 3A is a timing diagram, according to an embodiment, depicting duty cycle control signals of the multilevel DC-DC converter operating in a substantially full duty cycle mode, along with hatching to show timing of sharing of the bootstrap capacitor and timing of refreshing of the bootstrap capacitor.

Accordingly, FIG. 3A is a timing diagram, according to an embodiment, depicting duty cycle control signals of the multilevel DC-DC converter operating in a substantially full duty cycle mode (e.g., D>75%). For example, the duty cycle gate drive circuitry 130 drives the control gate of the first high side primary switch 121 (M1) with the first duty cycle control signal understood as the zero-phase reference duty cycle control signal 121a (D0). In FIG. 3A the zero-phase reference duty cycle control signal 121a (D0) shown as having the duty cycle greater than seventy-five percent determines the multilevel DC-DC converter operating in the substantially full duty cycle mode (e.g., D>75%). Left to right hatching shows sharing of the bootstrap capacitor, and more particular transferring of the bootstrap capacitor voltage through the first pair of high and low drive high side switches 182, 192 (SHM1, SLM1) of the secondary switching circuitry, during the first quarter period of the cycle period (T) to drive the control gate of the first high side primary switch 121 (M1). Cross hatching shows sharing of the bootstrap capacitor, and more particular transferring of the bootstrap capacitor voltage through the secondary switching circuitry, during the second and third quarter periods of the cycle period (T) to drive the control gate of the central high side primary switch 123 (M3). Right to left hatching shows refreshing of the bootstrap capacitor with charge during the fourth quarter period of the cycle period (T).

Figure 3B:
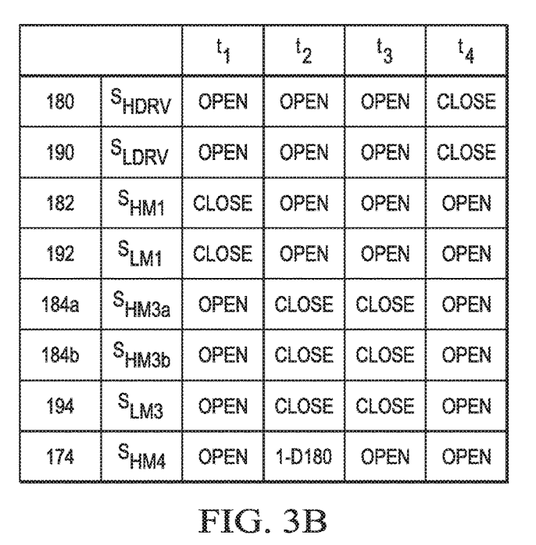
FIG. 3B is a truth table, according to an embodiment, describing open non-conducting states and closed conducting states of the secondary switches of FIGS. 1 and 2 during first, second, third and fourth quarter periods of the timing diagram of the substantially full duty cycle mode shown in FIG. 3A.

FIG. 3B is a truth table, according to an embodiment, describing open non-conducting states and closed conducting states of the secondary switches of FIGS. 1 and 2 during first, second, third and fourth quarter periods of the timing diagram of the substantially full duty cycle mode shown in FIG. 3A. During the first quarter period the first pair of high and low drive high side switches 182, 192 (SHM1, SLM1) are closed in the conducting state and the other secondary switches are open in the non-conducting state. This is to share the bootstrap capacitor, and more particular to transfer the bootstrap capacitor voltage through the first pair of high and low drive high side switches 182, 192 (SHM1, SLM1), during the first quarter period of the cycle period (T) to drive the control gate of the first high side primary switch 121 (M1). During the second and third quarter periods, the second pair of high and low drive high side switches 184a, 194 (SHM3a, SLM3) and the additional high drive high side switch 184b (SHM3b) are closed in the conducting state and the other secondary switches are open in the non-conducting state, with the exception of the high drive low side switch 174 (SHM4) during the second quarter period. During the second quarter period, the high drive low side switch 174 (SHM4) is controlled in the conducting switch state synchronized with 1-D180, which is an inverse of a one-hundred-and-eighty degree phase shift of the duty cycle control signal of the first high side primary switch 121 (M1) (e.g. inverse of the one-hundred-and-eighty degree phase shift of D0.) The second pair of high and low drive high side switches 184a, 194 (SHM3a, SLM3) and the additional high drive high side switch 184b (SHM3b) are closed in the conducting state during the second and third quarter periods to share of the bootstrap capacitor, and more particularly to transfer the bootstrap capacitor voltage through these switches of the secondary switching circuitry, during the second and third quarter periods of the cycle period (T) to drive the control gate of the central high side primary switch 123 (M3). During the second quarter period the high drive low side switch 174 (SHM4) is controlled in the conducting switch state synchronized with 1-D180 to share of the bootstrap capacitor, and more particularly to transfer the bootstrap capacitor voltage through the high drive low side switch 174 (SHM4) to drive the control gate of central low side primary switch 124 (M4). During the fourth quarter period, the high drive high side driving source voltage switch 180 (SHDRV) and the low drive high side driving source ground reference switch 190 (SLDRV) are closed in the conducting state and the other secondary switches are open in the non-conducting state to refresh the bootstrap capacitor with charge.

Figure 4A:
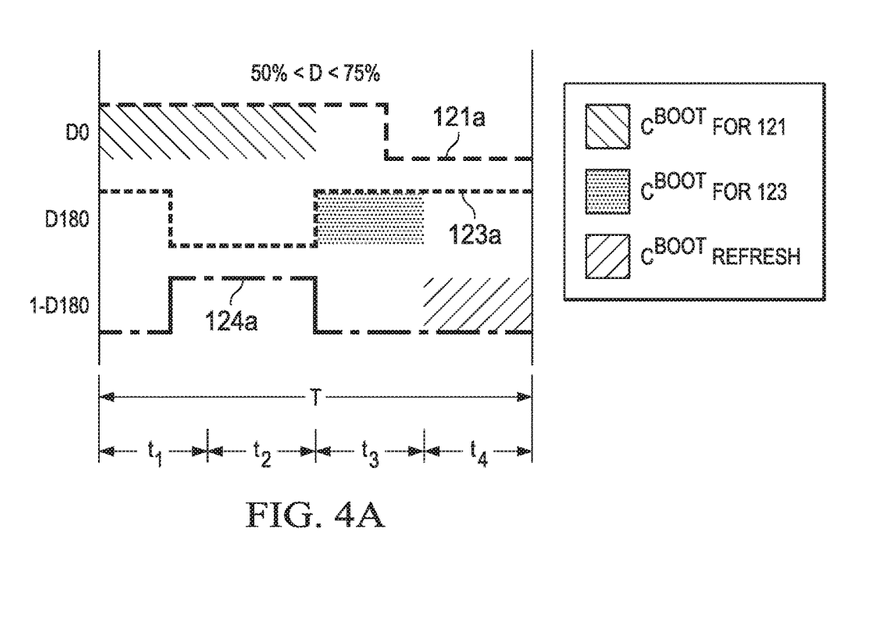
FIG. 4A is a timing diagram, according to an embodiment, depicting duty cycle control signals of the multilevel DC-DC converter operating in a duty cycle mode between fifty percent duty cycle and seventy-five percent duty cycle, along with hatching to show timing of sharing of the bootstrap capacitor and timing of refreshing of the bootstrap capacitor.

The timing diagram of FIG. 4A depicts, according to an embodiment, duty cycle control signals of the multilevel DC-DC converter operating in a duty cycle mode between fifty percent duty cycle and seventy-five percent duty cycle. In FIG. 4A the zero-phase reference duty cycle control signal 121a (D0) shown as having the duty cycle between fifty percent and seventy-five percent determines the multi-level DC-DC converter operating mode as between fifty and seventy-five percent duty cycle (e.g., 50%<D<75%). Left to right hatching shows sharing of the bootstrap capacitor, and more particular transferring of the bootstrap capacitor voltage through the first pair of high and low drive high side switches 182, 192 (SHM1, SLM1) of the secondary switching circuitry, during the first and second quarter periods of the cycle period (T) to drive the control gate of the first high side primary switch 121 (M1). Cross hatching shows sharing of the bootstrap capacitor, and more particular transferring of the bootstrap capacitor voltage through the secondary switching circuitry, during the third quarter period of the cycle period (T) to drive the control gate of the central high side primary switch 123 (M3). Right to left hatching shows refreshing of the bootstrap capacitor with charge during the fourth quarter period of the cycle period (T).

Figure 4B:
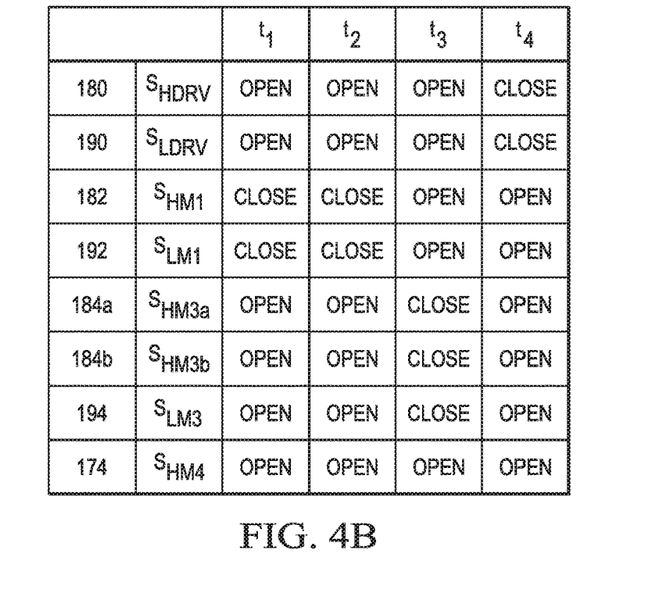
FIG. 4B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 4A.

FIG. 4B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 4A. During the first and second quarter periods the first pair of high and low drive high side switches 182, 192 (SHM1, SLM1) are closed in the conducting state and the other secondary switches are open in the non-conducting state. This is to share the bootstrap capacitor, and more particular to transfer the bootstrap capacitor voltage through the first pair of high and low drive high side switches 182, 192 (SHM1, SLM1), during the first and second quarter period of the cycle period (T) to drive the control gate of the first high side primary switch 121 (M1). The second pair of high and low drive high side switches 184a, 194 (SHM3a, SLM3) and the additional high drive high side switch 184b (SHM3b) are closed in the conducting state during the third quarter period to share of the bootstrap capacitor, and more particularly to transfer the bootstrap capacitor voltage through these switches of the secondary switching circuitry, during the third quarter period of the cycle period (T) to drive the control gate of the central high side primary switch 123 (M3). During the fourth quarter period, the high drive high side driving source voltage switch 180 (SHDRV) and the low drive high side driving source ground reference switch 190 (SLDRV) are closed in the conducting state and the other secondary switches are open in the non-conducting state to refresh the bootstrap capacitor with charge.

Figure 5A:
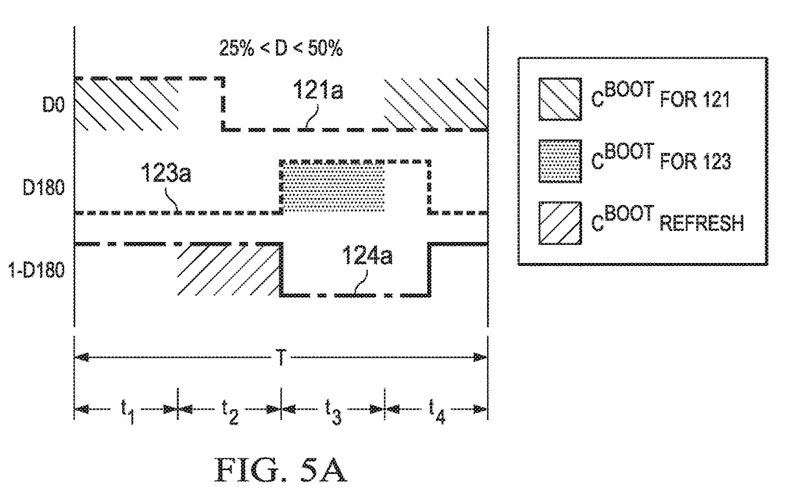
FIG. 5A is a timing diagram, according to an embodiment, depicting duty cycle control signals of the multilevel DC-DC converter operating in a duty cycle mode between twenty-five percent duty cycle and fifty percent duty cycle, along with hatching to show timing of sharing of the bootstrap capacitor and timing of refreshing of the bootstrap capacitor.

FIG. 5A is a timing diagram, according to an embodiment, depicting duty cycle control signals of the multilevel DC-DC converter operating in a duty cycle mode between twenty-five percent duty cycle and fifty percent duty cycle. In FIG. 5A the zero-phase reference duty cycle control signal 121a (D0) shown as having the duty cycle between twenty-five percent duty cycle and fifty percent duty cycle determines the multilevel DC-DC converter operating mode as between twenty-five percent duty cycle and fifty percent duty cycle (e.g., 25%<D<50%). Left to right hatching shows sharing of the bootstrap capacitor, and more particular transferring of the bootstrap capacitor voltage through the first pair of high and low drive high side switches 182, 192 (SHM1, SLM1) of the secondary switching circuitry, during the first and fourth quarter periods of the cycle period (T) to drive the control gate of the first high side primary switch 121 (M1). Cross hatching shows sharing of the bootstrap capacitor, and more particular transferring of the bootstrap capacitor voltage through the secondary switching circuitry, during the third quarter period of the cycle period (T) to drive the control gate of the central high side primary switch 123 (M3). Right to left hatching shows refreshing of the bootstrap capacitor with charge during the second quarter period of the cycle period (T).

Figure 5B:
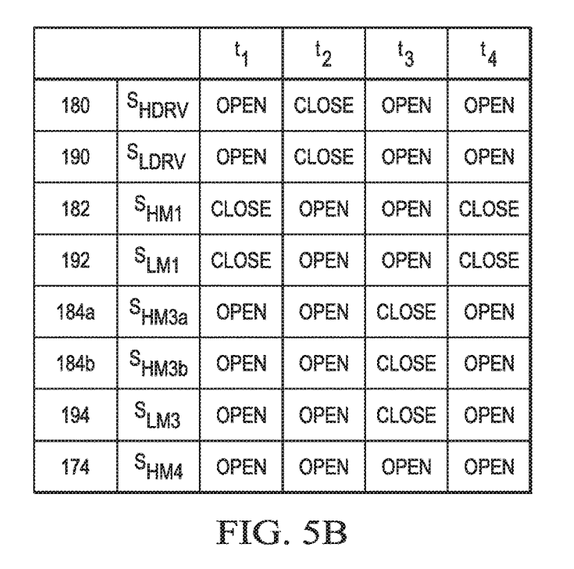
FIG. 5B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 5A.

FIG. 5B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 5A. During the first and fourth quarter periods the first pair of high and low drive high side switches 182, 192 (SHM1, SLM1) are closed in the conducting state and the other secondary switches are open in the non-conducting state. This is to share the bootstrap capacitor, and more particular to transfer the bootstrap capacitor voltage through the first pair of high and low drive high side switches 182, 192 (SHM1, SLM1), during the first and fourth quarter periods of the timing diagram to drive the control gate of the first high side primary switch 121 (M1). The second pair of high and low drive high side switches 184a, 194 (SHM3a, SLM3) and the additional high drive high side switch 184b (SHM3b) are closed in the conducting state during the third quarter period to share of the bootstrap capacitor, and more particularly to transfer the bootstrap capacitor voltage through these switches of the secondary switching circuitry, during the third quarter period of the cycle period (T) to drive the control gate of the central high side primary switch 123 (M3). During the second quarter period, the high drive high side driving source voltage switch 180 (SHDRV) and the low drive high side driving source ground reference switch 190 (SLDRV) are closed in the conducting state and the other secondary switches are open in the non-conducting state to refresh the bootstrap capacitor with charge.

Figure 6A:
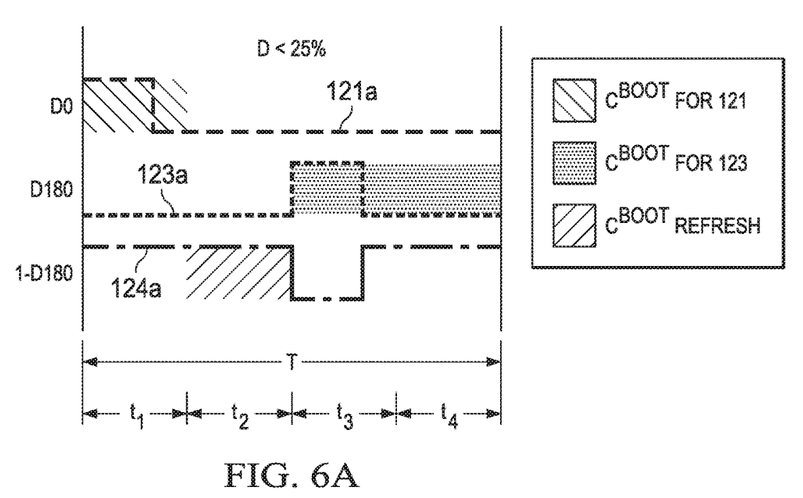
FIG. 6A is a timing diagram, according to an embodiment, depicting duty cycle control signals of the multilevel DC-DC converter operating in a duty cycle mode of less than twenty-five percent duty cycle, along with hatching to show timing of sharing of the bootstrap capacitor and timing of refreshing of the bootstrap capacitor.

FIG. 6A is a timing diagram, according to an embodiment, depicting duty cycle control signals of the multilevel DC-DC converter operating in a duty cycle mode of less than twenty-five percent duty cycle, along with hatching to show timing of sharing of the bootstrap capacitor and timing of refreshing of the bootstrap capacitor. In FIG. 6A the zero-phase reference duty cycle control signal 121a (D0) shown as having the duty cycle less than twenty-five percent determines the multilevel DC-DC converter operating in the less than twenty-five percent duty cycle mode (e.g., D<25%). Left to right hatching shows sharing of the bootstrap capacitor, and more particular transferring of the bootstrap capacitor voltage through the first pair of high and low drive high side switches 182, 192 (SHM1, SLM1) of the secondary switching circuitry, during the first quarter period of the cycle period (T) to drive the control gate of the first high side primary switch 121 (M1). Cross hatching shows sharing of the bootstrap capacitor, and more particular transferring of the bootstrap capacitor voltage through the secondary switching circuitry, during the third and fourth quarter periods of the timing diagram to drive the control gate of the central high side primary switch 123 (M3). Right to left hatching shows refreshing of the bootstrap capacitor with charge during the second quarter period of the cycle period (T).

Figure 6B:
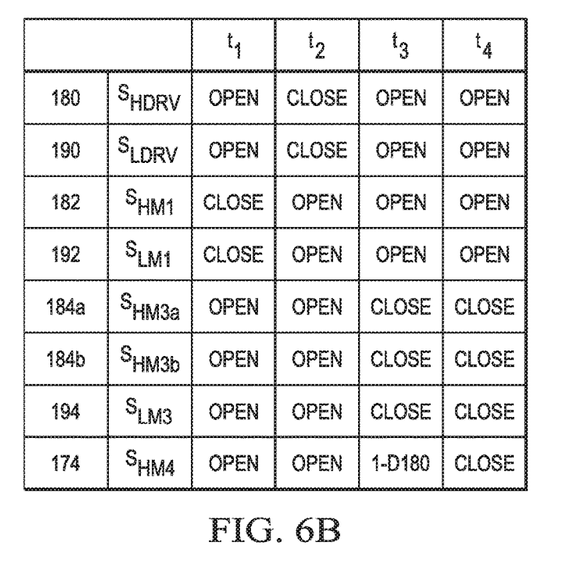
FIG. 6B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 6A.

FIG. 6B is a truth table, according to an embodiment, describing open non-conducting states and closed conducting states of the secondary switches of FIGS. 1 and 2 during first, second, third and fourth quarter periods of the timing diagram of the duty cycle mode shown in FIG. 6A. During the first quarter period the first pair of high and low drive high side switches 182, 192 (SHM1, SLM1) are closed in the conducting state and the other secondary switches are open in the non-conducting state. This is to share the bootstrap capacitor, and more particular to transfer the bootstrap capacitor voltage through the first pair of high and low drive high side switches 182, 192 (SHM1, SLM1), during the first quarter period of the cycle period (T) to drive the control gate of the first high side primary switch 121 (M1). During the third and fourth quarter periods, the second pair of high and low drive high side switches 184a, 194 (SHM3a, SLM3) and the additional high drive high side switch 184b (SHM3b) are closed in the conducting state and the other secondary switches are open in the non-conducting state, with the exception of the high drive low side switch 174 (SHM4) during the third quarter period. During the third quarter period, the high drive low side switch 174 (SHM4) is controlled in the conducting switch state synchronized with 1-D180, which is the inverse of a one-hundred-and-eighty degree phase shift of the duty cycle control signal of the first high side primary switch 121 (M1) (e.g. inverse of the one-hundred-and-eighty degree phase shift of D0.) The second pair of high and low drive high side switches 184a, 194 (SHM3a, SLM3) and the additional high drive high side switch 184b (SHM3b) are closed in the conducting state during the third and fourth quarter periods to share of the bootstrap capacitor, and more particularly to transfer the bootstrap capacitor voltage through these switches of the secondary switching circuitry, during the third and fourth quarter periods of the cycle period (T) to drive the control gate of the central high side primary switch 123 (M3). During the third quarter period the high drive low side switch 174 (SHM4) is controlled in the conducting switch state synchronized with 1-D180 to share of the bootstrap capacitor, and more particularly to transfer the bootstrap capacitor voltage through the high drive low side switch 174 (SHM4) to drive the control gate of central low side primary switch 124 (M4). During the second quarter period, the high drive high side driving source voltage switch 180 (SHDRV) and the low drive high side driving source ground reference switch 190 (SLDRV) are closed in the conducting state and the other secondary switches are open in the non-conducting state to refresh the bootstrap capacitor with charge.

While an example manner of implementing the example system of secondary switching circuitry for sharing the bootstrap capacitor in the context of the multilevel DC-DC converter circuit topology for the bootstrap capacitor is shown in the examples of FIGS. 1 and 2, one or more of the elements, processes and/or devices illustrated in FIGS. 1 and 2 may be combined, divided, re-arranged, omitted, eliminated and/or implemented in any other way.

Further, the example bootstrap capacitor 110, example bootstrap capacitor couplers 110a, 110b, example secondary switching circuitry 112, example multilevel DC-DC converter circuit topology 120, example first high side primary switch 121, example central high side primary switch 123, example central low side primary switch 124, example ground referenced low side primary switch 122, example first duty cycle control signal 121a (D0), example second duty cycle control signal 123a, example third duty cycle control signal 124a (1-D180), example fourth duty cycle control signal 122a (1-D0), example inductor 128a, example output capacitor 128b, example flying capacitor 128c, example duty cycle gate drive circuitry 130, example first high side primary driver 131 along with example associated driver capacitor 131a, example central high side primary driver 133 along with example associated driver capacitor 133a, example ground referenced low side primary driver 132, example drive control circuitry 140, example first drive control signal 140a, example second drive control signal 140b, example third drive control signal 140c, example high drive high side secondary switching circuitry 150, example high drive high side secondary switching control circuitry 152, example low drive high side secondary switching circuitry 160, example low drive high side secondary switching control circuitry 162, example high drive low side secondary switching circuitry 170, example high drive low side secondary switching control circuitry 172, example first and second pairs of respective high and low drive high side drive outputs 154, 164, 156, 166, example high drive low side drive output 178, example high drive high side driving source voltage switch 180 (SHDRV), example first high drive high side switch 182 (SHM1), example second high drive high side switch 184a (SHM3a), example additional high drive high side switch 184b (SHM3b), example low drive high side driving source ground reference switch 190 (SLDRV), example first low drive high side switch 192 (SLM1), example second low drive high side switch 194 (SLM3), example high drive low side switch 174 (SHM4), example regulation clamp 196 and more generally the example system 100 of the example secondary switching circuitry for sharing the example bootstrap capacitor in the context of the example multilevel DC-DC converter circuit topology for the example bootstrap capacitor, as shown in the examples of FIGS. 1 and 2, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example system of secondary switching circuitry for sharing the bootstrap capacitor in the context of the multilevel DC-DC converter circuit topology for the bootstrap capacitor, as shown in the examples of FIGS. 1 and 2, may include one or more elements, processes and/or devices in addition to, or instead of, those illustrated in FIGS. 1 and 2, and/or may include more than one of any or all of the illustrated elements, processes and devices.

Figure 7:
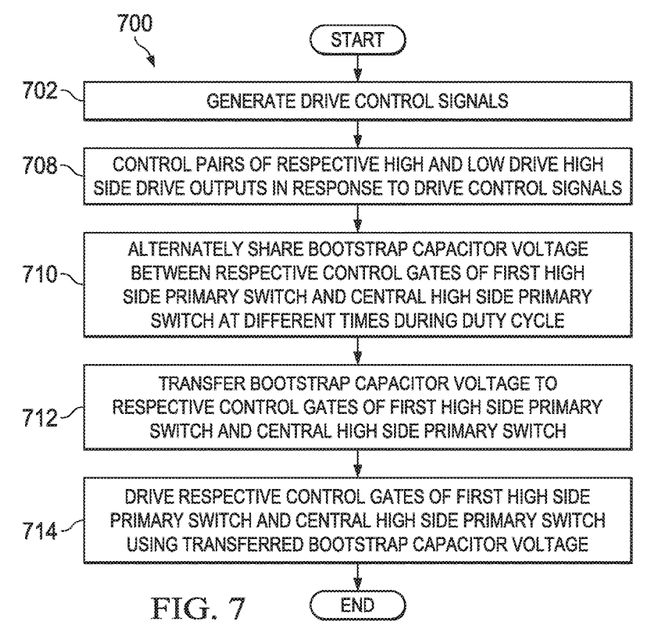
FIG. 7 shows a flowchart, according to an embodiment, representative of example machine readable instructions that may be executed to implement the example system of secondary switching circuitry for sharing the bootstrap capacitor in the context of the multilevel DC-DC converter circuit topology for the bootstrap capacitor, as shown in the examples of FIGS. 1 and 2.
Figure 8:
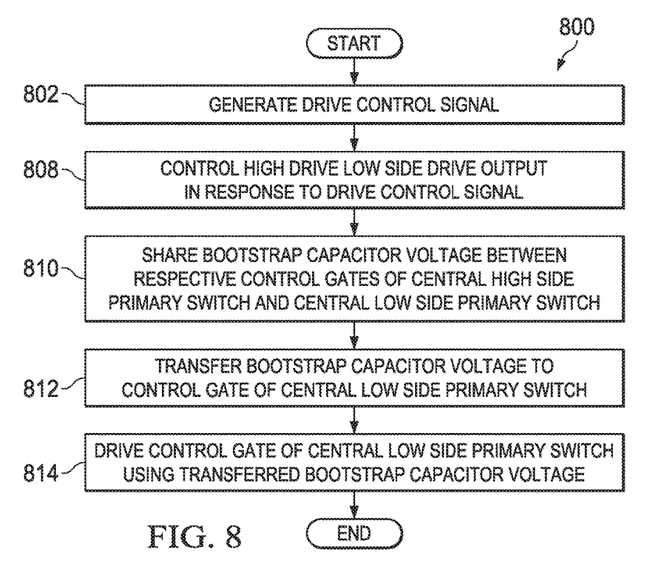
FIG. 8 shows another flowchart, according to another embodiment, representative of example machine readable instructions that may be executed to implement the example system of secondary switching circuitry for sharing the bootstrap capacitor in the context of the multilevel DC-DC converter circuit topology for the bootstrap capacitor, as shown in the examples of FIGS. 1 and 2.

FIGS. 7 and 8 show flowcharts, according to an embodiments, representative of example machine readable instructions that may be executed to implement the example system of secondary switching circuitry for sharing the bootstrap capacitor in the context of the multilevel DC-DC converter circuit topology for the bootstrap capacitor, as shown in the examples of FIGS. 1 and 2. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although example programs are described with reference to the flowcharts illustrated in FIGS. 7 and 8, many other methods of implementing the example secondary switching circuitry for sharing the bootstrap capacitor in the context of the multilevel DC-DC converter circuit topology for the bootstrap capacitor may alternatively be used. For example, the order of execution of the blocks may be changed, and/or some of the blocks described may be changed, eliminated, or combined.

FIG. 7 is a process flow, according to an embodiment, representative of an example method 700 to implement the example system 100 of the secondary switching circuitry 112 for sharing the bootstrap capacitor in the context of the example multilevel DC-DC converter circuit topology 120 for the bootstrap capacitor 110, as shown in the examples of FIGS. 1 and 2. Although an example method 700 is described with reference to the flowchart illustrated in FIG. 7, many other methods of implementing the example may alternatively be used. For example, the order of execution of the blocks may be changed, and/or some of the blocks described may be changed, eliminated, or combined. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

A process flow 700 of FIG. 7 can begin at block 702. At block 702, drive control signals are generated. At block 708, first and second pairs of respective high and low drive high side drive outputs can be controlled in response to the drive control signals. For example, drive control circuitry 140 can generate drive control signals that can be coupled with the secondary switching circuitry 112, for control of first and second pairs of respective high and low drive high side drive outputs of the secondary switching circuitry 112. At block 710, the bootstrap capacitor voltage (e.g., VCBOOT) of the bootstrap capacitor can be alternately shared between respective control gates of the first high side primary switch and the central high side primary switch of the multilevel DC-DC converter at different times during a duty cycle of the multilevel DC-DC converter. At block driving respective control gates of the first high side primary switch and the central high side primary switch of the multilevel DC-DC converter can be driven using the transferred bootstrap capacitor voltage. At block 712, the bootstrap capacitor voltage (e.g., VCBOOT) of the bootstrap capacitor can be transferred through the first and second pairs of respective high and low drive high side drive outputs to respective control gates of the first high side primary switch and the central high side primary switch of the multilevel DC-DC converter. At block 714, respective control gates of the first high side primary switch and the central high side primary switch of the multilevel DC-DC converter can be driven using the transferred bootstrap capacitor voltage. Driving the respective control gates of the first high side primary switch and the central high side primary switch of the multilevel DC-DC converter using the transferred bootstrap capacitor voltage ensures full gate drive of the first and central high side primary switches to avoid channel resistance degradation thereof. After block 714, the example method 700 can end.

FIG. 8 is another process flow, according to another embodiment, representative of an example method 800 to implement the example system 100 of the secondary switching circuitry 112 for sharing the bootstrap capacitor in the context of the example multilevel DC-DC converter circuit topology 120 for the bootstrap capacitor 110, as shown in the examples of FIGS. 1 and 2. Although an example method 800 is described with reference to the flowchart illustrated in FIG. 8, many other methods of implementing the example may alternatively be used. For example, the order of execution of the blocks may be changed, and/or some of the blocks described may be changed, eliminated, or combined. At block 802, a drive control signal is generated. At block 808, a high drive low side drive output can be controlled in response to the drive control signal. For example, drive control circuitry 140 can generate a drive control signal that can be coupled with the secondary switching circuitry 112, for control of the high drive low side drive output of the secondary switching circuitry 112. At block 810, the bootstrap capacitor voltage (e.g., VCBOOT) of the bootstrap capacitor can be shared between respective control gates of the central high side primary switch and the central low side primary switch of the multilevel DC-DC converter. At block 812, the bootstrap capacitor voltage of the bootstrap capacitor can be transferred through the high drive low side drive output to a control gate of the central low side primary switch of the multilevel DC-DC converter. At block 814, the control gate of the central low side primary switch of the multilevel DC-DC converter can be driven using the transferred bootstrap capacitor voltage. Driving the control gate of the central high side primary switch of the multilevel DC-DC converter using the transferred bootstrap capacitor voltage can ensure full gate drive of the central high side primary switch to avoid channel resistance degradation thereof. After block 814, the example method 800 can end.

Figure 9:
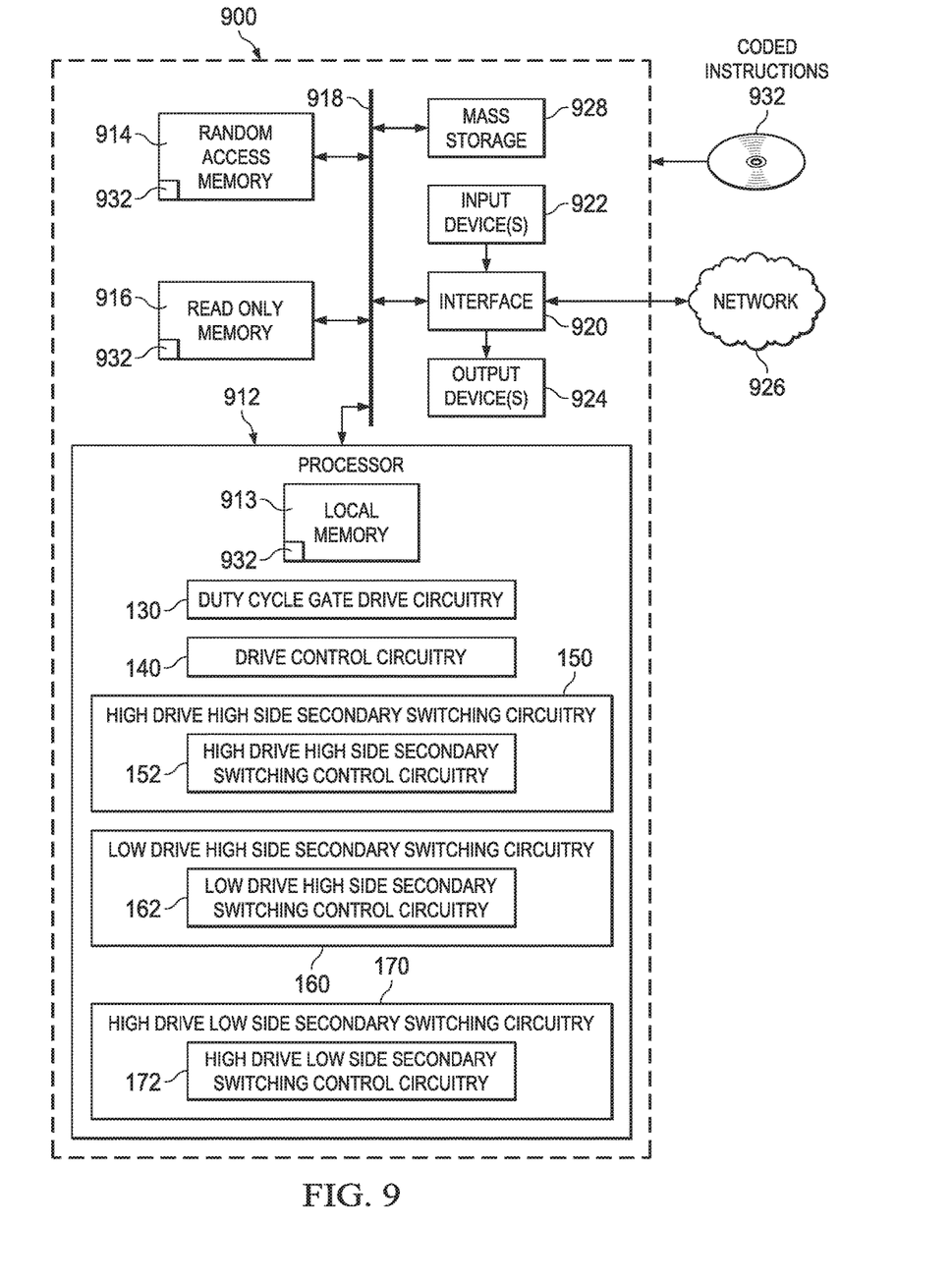
FIG. 9 is a block diagram, according to an embodiment, of an example processing platform capable of executing the machine readable instructions of FIGS. 7 and 8 to implement the system of secondary switching circuitry for sharing the bootstrap capacitor in the context of the multilevel DC-DC converter circuit topology for the bootstrap capacitor, as shown in the examples of FIGS. 1 and 2.

FIG. 9 is a block diagram, according to an embodiment, of an example processing platform capable of executing the machine readable instructions of FIGS. 7 and 8 to implement the example system 100 of secondary switching circuitry for sharing the bootstrap capacitor in the context of the multilevel DC-DC converter circuit topology for the bootstrap capacitor, as shown in the examples of FIGS. 1 and 2. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware of processor 912 can be virtualized using virtualization such as Virtual Machines and/or containers. The processor 912 can implement example duty cycle gate drive circuitry 130 and example drive control circuitry 140 and example high drive high side secondary switching circuitry 150 and example low drive high side secondary switching circuitry 160 and example high drive low side secondary switching circuitry 170. Example high drive high side secondary switching circuitry 150 can include high drive high side secondary switching control circuitry 152. Example low drive high side secondary switching circuitry 160 can include example low drive high side secondary switching control circuitry 162. Example high drive low side secondary switching circuitry 170 can include example high drive low side secondary switching control circuitry 172.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and 8 may be stored in the mass storage device 928, in the volatile memory 914, in the non-volatile memory 916, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to be coupled with a bootstrap capacitor through bootstrap capacitor couplers comprising:
    a multilevel DC-DC converter including a series connection of at least four primary switches extending between a DC voltage rail and a ground reference;
    duty cycle gate drive circuitry;
    high and low drive high side secondary switching circuitry to control first and second pairs of respective high and low drive high side drive outputs coupled through the duty cycle gate drive circuitry with respective control gates of a first high side primary switch and a central high side primary switch of the at least four primary switches;
    the bootstrap capacitor couplers coupled between the high and low drive high side secondary switching circuitry to transfer a bootstrap capacitor voltage of the bootstrap capacitor to drive respective control gates of the first high side primary switch and the central high side primary switch using the transferred bootstrap capacitor voltage; and
    high drive low side secondary switching circuitry to control a high drive low side drive output coupled through the duty cycle gate drive circuitry to drive a control gate of a central low side primary switch of the at least four primary switches when the multilevel DC-DC converter is operated in a greater than 75% duty cycle mode, wherein the high drive low side secondary switching circuitry is coupled with the high drive high side secondary switching circuitry to transfer the bootstrap capacitor voltage of the bootstrap capacitor to drive the control gate of the central low side primary switch using the transferred bootstrap capacitor voltage when the multilevel DC-DC converter is operated in the greater than 75% duty cycle mode.

2. The apparatus of claim 1 wherein
    the high and low drive high side secondary switching circuitry is to transfer the bootstrap capacitor voltage of the bootstrap capacitor to drive respective control gates of the first high side primary switch and the central high side primary switch using the transferred bootstrap capacitor voltage when the multilevel DC-DC converter is operating in the greater than 75% duty cycle mode.

3. The apparatus of claim 1 wherein the bootstrap capacitor voltage transferred to drive respective control gates of the first and central high side primary switches ensures full gate drive of the first and central high side primary switches to avoid channel resistance degradation thereof.

4. The apparatus of claim 1 wherein the bootstrap capacitor voltage transferred to drive the control gate of the central low side primary switch ensures full gate drive of the central low side primary switch to avoid channel resistance degradation thereof when the multilevel DC-DC converter is operated in the greater than 75% duty cycle mode.

5. The apparatus of claim 1 including drive control circuitry to generate a third drive control signal, wherein the high drive low side secondary switching circuitry is to control the high drive low side drive output in response to the third drive control signal when the multilevel DC-DC converter is operated in the greater than 75% duty cycle mode.

6. The apparatus of claim 1 wherein the bootstrap capacitor couplers coupled to the high drive low side secondary switching circuitry are to transfer the bootstrap capacitor voltage of the bootstrap capacitor through the high drive low side secondary switching circuitry and through the high drive low side drive output and through the duty cycle gate drive circuitry to drive the control gate of the central low side primary switch using the transferred bootstrap capacitor voltage when the multilevel DC-DC converter is operated in the greater than 75% duty cycle mode.

7. The apparatus of claim 1 including drive control circuitry to generate first and second drive control signals, wherein the high and low drive high side secondary switching circuitry is to control first and second pairs of respective high and low drive high side drive outputs in response to the first and second drive control signals.

8. The apparatus of claim 1 wherein the bootstrap capacitor couplers, coupled between the high and low drive high side secondary switching circuitry are to transfer the bootstrap capacitor voltage of the bootstrap capacitor through the high and low drive high side secondary switching circuitry and through the first and second pairs of respective high and low drive high side drive outputs and through the duty cycle gate drive circuitry to drive respective control gates of the first high side primary switch and the central high side primary switch using the transferred bootstrap capacitor voltage.

9. The apparatus of claim 1 wherein the multilevel DC-DC converter is a three level DC-DC converter.

10. An apparatus to be coupled with a bootstrap capacitor through bootstrap capacitor couplers comprising:
- a multilevel DC-DC converter including a series connection of at least four primary switches extending between a DC voltage rail and a ground reference;
- duty cycle gate drive circuitry;
- high and low drive high side secondary switching circuitry to control first and second pairs of respective high and low drive high side drive outputs coupled through the duty cycle gate drive circuitry with respective control gates of a first high side primary switch and a central high side primary switch of the at least four primary switches;
- the bootstrap capacitor couplers coupled between the high and low drive high side secondary switching circuitry to transfer a bootstrap capacitor voltage of the bootstrap capacitor to drive respective control gates of the first high side primary switch and the central high side primary switch using the transferred bootstrap capacitor voltage; and drive control circuitry to generate a third drive control signal, wherein a high drive low side secondary switching circuitry is to control a high drive low side drive output in response to the third drive control signal, the high drive low side drive output coupled to the duty cycle gate drive circuitry to drive a control gate of a central low side primary switch of the at least four primary switches, when the multilevel DC-DC converter is operated in a less than twenty five percent duty cycle mode, wherein the bootstrap capacitor couplers coupled to the high drive low side secondary switching circuitry are to transfer the bootstrap capacitor voltage of the bootstrap capacitor through the high drive low side secondary switching circuitry and through the high drive low side drive output and through the duty cycle gate drive circuitry to drive the control gate of the central low side primary switch using the transferred bootstrap capacitor voltage when the multilevel DC-DC converter is operated in the less than twenty five percent duty cycle mode.

11. The apparatus of claim 10 wherein the bootstrap capacitor voltage transferred to drive the control gate of the central low side primary switch ensures full gate drive of the central low side primary switch to avoid channel resistance degradation thereof when the multilevel DC-DC converter is operated in the less than twenty five percent duty cycle mode.

12. The apparatus of claim 10 wherein the multilevel DC-DC converter is a three level DC-DC converter.

* * * * *